(12) United States Patent
Tripathi (10) Patent No.: US 6,587,442 B1
(45) Date of Patent: Jul. 1, 2003

(54) ENHANCED POWER CONTROL ALGORITHMS FOR FIXED WIRELESS ACCESS SYSTEMS

(75) Inventor: Nishith D. Tripathi, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/429,856

(22) Filed: Oct. 28, 1999

(51) Int. Cl.[7] .............................................. G08C 17/00
(52) U.S. Cl. ....................... 370/311; 370/318; 370/320; 455/522; 455/69; 455/504; 455/505; 455/506
(58) Field of Search ...................... 455/522, 69, 3.05, 455/504, 505, 506; 370/318, 320, 311

(56) References Cited

U.S. PATENT DOCUMENTS

| | | | |
|---|---|---|---|
| 5,396,645 A | * 3/1995 | Huff | 455/134 |
| 5,745,520 A | * 4/1998 | Love et al. | 375/130 |
| 5,787,348 A | * 7/1998 | Willey et al. | 342/104 |
| 5,884,187 A | * 3/1999 | Ziv et al. | 455/442 |
| 5,943,610 A | * 8/1999 | Endo | 455/456 |
| 5,982,760 A | * 11/1999 | Chen | 370/335 |
| 5,991,636 A | * 11/1999 | Won et al. | 455/522 |
| 6,047,169 A | * 4/2000 | Dent | 455/127 |
| 6,058,107 A | * 5/2000 | Love et al. | 370/252 |
| 6,259,928 B1 | * 7/2001 | Vembu | 455/522 |
| 6,295,289 B1 | * 9/2001 | Ionescu et al. | 370/342 |
| 6,298,220 B1 | * 10/2001 | Barnhart et al. | 455/13.4 |
| 6,418,322 B1 | * 7/2002 | Kim et al. | 455/522 |
| 2002/0001292 A1 | * 1/2002 | Miyamoto | 370/335 |

* cited by examiner

*Primary Examiner*—William Trost
*Assistant Examiner*—Marcos Torres
(74) *Attorney, Agent, or Firm*—John D. Crane; Bracewell & Patterson, L.L.P.

(57) ABSTRACT

A method for efficient power control in a (CDMA based) fixed wireless system. The method comprises the steps of (1) monitoring a transmission link of the fixed wireless system for an occurrence of a fade, (2) recording a number of power increases to the transmission link due to said fade, and (3) reducing the power to an appropriate level when said fade is over. The adjusting step includes the steps of determining an appropriate power-down step size, which results in saving power, wherein the step size is influenced by a frame error rate (FER) and selected to maintain a desired FER, and dynamically decreasing the power by the appropriate power-down step size, thereby conserving power and increasing system capacity.

19 Claims, 4 Drawing Sheets

ENHANCED POWER CONTROL ALGORITHMS FOR FIXED WIRELESS ACCESS SYSTEMS

BACKGROUND OF THE INVENTION

1. Technical Field

The present invention relates generally to cellular communication systems and in particular to a fixed wireless communication system. Still more particular, the present invention relates to a method and system for more effective power control in a fixed wireless communication system.

2. Description of the Related Art

Fixed wireless cellular communication networks are often established in a geographical location in which a public switched telephone network (i.e., landline) is not available. In a fixed wireless cellular communication network, a base station communicates with a plurality of fixed wireless stations that are often used in place of routine public switched telephones. Because the fixed wireless stations (fixed wireless terminals) serve as a substitute for ordinary landline phones, their physical characteristics and the manner in which they are used are different from ordinary cellular mobile stations (eg., cellular phones).

For example, the fixed wireless terminals are typically placed in one location for a period of time without being moved to another location. One reason for this is that a typical fixed wireless terminal is much larger and heavier than an ordinary palm sized mobile station. The fixed wireless terminals are larger because they have to transmit at higher power levels to be able to communicate with a remote base station. In a typical fixed wireless system, the fixed wireless cells, or geographic areas served by one base station, are often larger than routine cellular cells, and thus, transmission power requirements are higher. The higher transmission power requirements in turn lead to the use of power transmitters that are both larger and heavier.

During their operation, mobile stations encounter spatial (or spaced based) fading (shadow fading) which is primarily caused by the introduction and removal of obstructions (and multi-path routes) between the base station and the mobile station. The shadow fading changes rapidly over time as the mobile station moves during its operation.

Because fixed wireless terminals frequently remain stationary during their operation as compared with ordinary mobile stations, common types of interference are often observed for longer periods. The fixed wireless terminal is unable to change its position in relation to the base station and to the source of the interference. Fading encountered by fixed wireless units is temporal (time-based) and is primarily caused by the moving environment (e.g., scattered rain showers). If a given signal received by a fixed wireless unit experiences a fade, the fade will frequently last for a sufficiently long period to cause the fixed wireless terminal to receive undesirably poor signal quality due to undesirably high frame error rates.

Typically, mobile systems operate according to the IS-95 standard. The IS-95 defines procedures for a complex power control method, designed to save on battery life and help prevent co-channel interference. The IS-95 standard has a basic algorithm that is implemented in both fixed and mobile networks. However, the IS-95 power control algorithm is designed for a mobile network. For a fixed wireless environment, the algorithm does not perform well, as described below.

The IS-95 standard is utilized within the Code Division Multiple Access (CDMA) protocol which is in turn used in cellular networks. In a CDMA-based cellular system, the system capacity (i.e., the number of simultaneous users supported by the system) is the most important factor affecting the revenue of the service provider. Higher capacity is desirable since it leads to higher revenues. The system capacity is usually limited by the forward link power available at the base station. Fixed wireless systems experience long fades which result in higher power requirements due to the characteristics of the propagation environment.

Power control is therefore one of the critical operations in CDMA cellular systems. Power control is performed on both forward and reverse links. Efficient power control can help achieve high system capacity. The capacity of a CDMA system, N, is inversely proportional to $P_{traffic}$ (which is the traffic control channel power). A good power control algorithm can reduce $P_{traffic}$, thereby increasing the capacity (N) A good power control algorithm also maintains a reasonable frame error rate (FER).

As described above, in a fixed wireless environment, temporal fades (due to unresolvable multipaths) are relatively long (i.e. spanning over several frames), causing several consecutive frame errors. These errors degrade voice quality and result in several gain increases (i.e., increases in the power requirements) to maintain a given FER. This in turn leads to a decrease in the system capacity. In a CDMA system, the system capacity is very sensitive to the power requirements. A good power control algorithm reduces the power requirements, increasing the system capacity. Thus, the existing power control algorithms are inefficient from the power conservation perspective.

In a fixed environment, fades last long, causing several frame errors. These errors cause the power control algorithm to demand more power for the user to maintain a certain quality of service. An existing algorithm is designed for short fades (observed in mobile networks) and does not perform well in a fixed environment. In the existing algorithm, there is one large step up in power and 100 small steps down in power for one frame error. Such power control loop operation helps achieve 1% FER.

The present invention thus recognizes that it would be desirable to have a method and system for effectively controlling power in a fixed wireless system. It is further desirable to have a power control method, which prevents unnecessary power increases due to long temporal fades, while maintaining a reasonable frame error rate (FER). It is further desirable to increase a capacity of a fixed wireless system by controlling the power usage during temporal fades.

SUMMARY OF THE INVENTION

It is therefore one objective of the present invention to provide an improved cellular communications system.

It is another objective of the present invention to provide an improved fixed cellular communications system.

It is yet another objective of the present invention to provide an improved fixed cellular communications system utilizing a method and system for controlling power, which increases system capacity by reducing the effects of temporal fades on the system's power.

The foregoing objectives are achieved as is now described. A method for efficient power control in a (CDMA based) fixed wireless system is disclosed. The method comprises the steps of (1) monitoring a transmission link of the fixed wireless system for an occurrence of a fade, (2)

recording a number of power increases to the transmission link due to said fade, and (3) reducing the power to an appropriate level when said fade is completed. The adjusting step includes the steps of determining an appropriate power-down step size, which results in saving power, wherein the step size is influenced by a frame error rate (FER) and selected to maintain a desired FER, and dynamically decreasing the power by the appropriate power-down step size, thereby conserving power and increasing system capacity.

In a preferred embodiment of the invention, the method is implemented with an algorithm which causes the opening of an observation window upon receipt of a PMRM. The time instances of gain increases are recorded, and then the observation window is closed when consecutive good frames occur. A preselected threshold, T, corresponding to a certain number of frames, is used as a parameter in the algorithm. If the first good frame of the consecutive good frames occurred within T frames of a gain increase, the digital gain is reduced by an amount equal to all subsequent gain increases after the gain increase, thus implementing a fast power-down operation.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention may be implemented with one of several new power control algorithms for a code division multiple access (CDMA) based fixed wireless communications network/system. However, the features are also applicable to other general (i.e., non-fixed) wireless systems and references to a fixed wireless system are provided solely for illustrative purposes and not meant to be limiting on the invention. Specifically, the invention provides new transmission link power control algorithms, which utilize the knowledge about short-term fading characteristics in a fixed wireless environment. The invention is applicable to both the forward and reverse links, although it will be described herein with reference to the forward link. The invention solves the power control and call drop problems inherent in prior systems by letting the receiver (i.e., the base station or fixed wireless terminals depending on whether transmission is in the forward or reverse link) determine whether power increases over a period of received flames is due to temporal fades, and dynamically adjusts the power to reduce the effects of such fades, while maintaining a relatively small frame error rate (FER). Thus, by implementing the invention, the system capacity improves by a substantial amount.

Various technical terms and/or acronyms will be utilized in the description of the embodiment. Those skilled in the art are familiar with these and other terms which may be utilized herein. A short list of the more common ones with their definitions include: (1) BTS: Base Transceiver Subsystem (base station); (2) CDMA: Code Division Multiple Access; (3) FER: Frame Error Rate; (4) MS: Mobile Station; (5) FEPCA: Feedback Evaluation Based Power Control Algorithm; (6) FLPCA: Forward Loop Power Control Algorithm; and (7) PMRM: Pilot Measurement Report Message.

Figure 1:
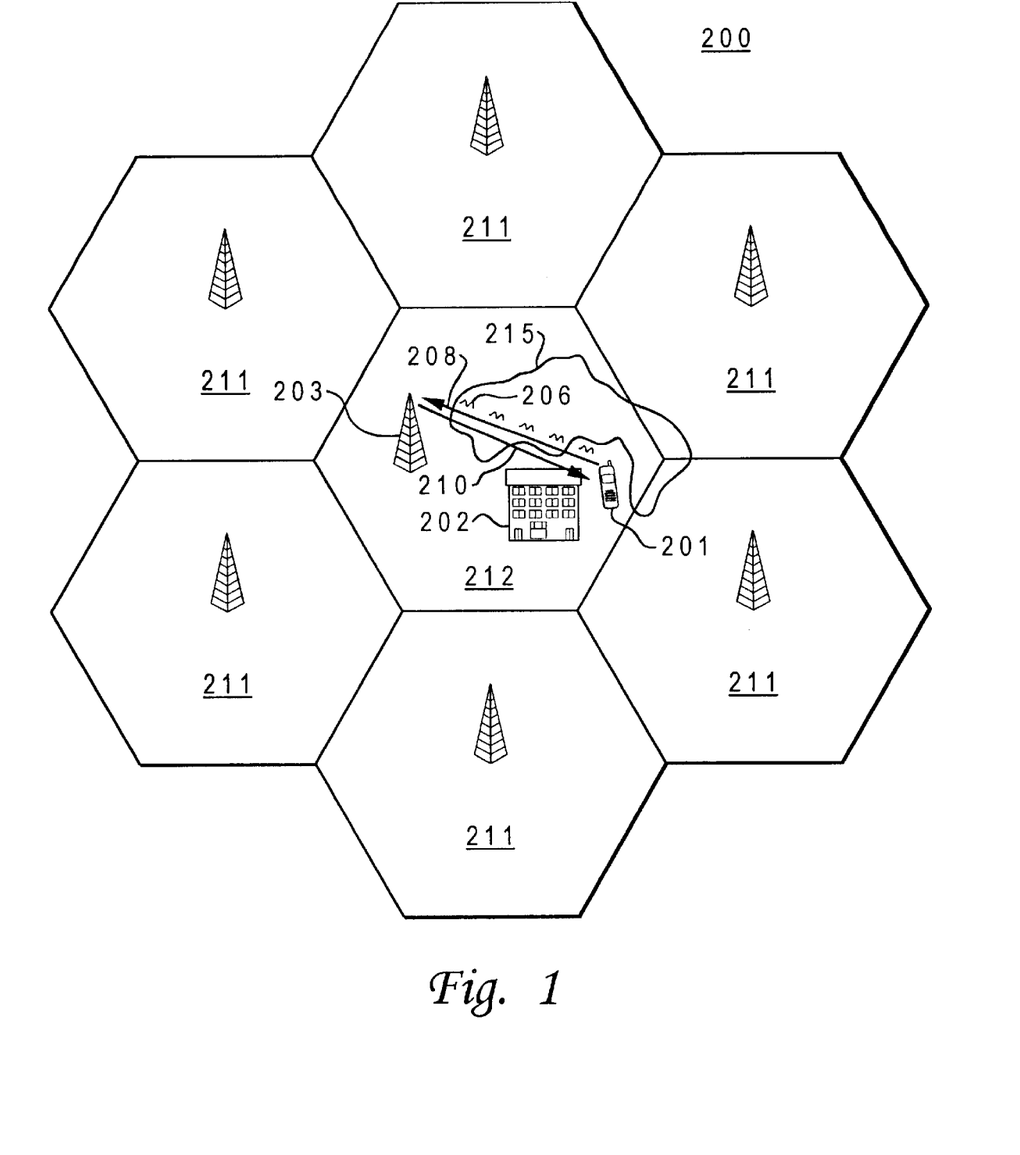
FIG. 1 illustrates a fixed wireless system utilized in accordance with a preferred embodiment of the present invention.

Turning now to FIG. 1, there is depicted a basic fixed wireless communications system 200. Fixed wireless communication system 200 consists of a plurality of cells 211, based on CDMA architecture. In one representative cell 212 is located a base station (BTS) 203 and a fixed wireless terminal 201 illustrated within building/structure 202. Fixed wireless terminal 201 accepts transmitted packets via airwaves 206 from originating BTS 203, and vice versa. The underlying transmission scheme utilizes CDMA protocol and is controlled by a series of routers, gateways, etc. not illustrated in this embodiment. Two arrowed paths are depicted corresponding to the forward propagation path 208 and reverse propagation path 210. Depending on the environment, each propagation path may selectively be a forward propagation path. The various embodiments presented are described with respect to a forward path, which is understood to refer to either the forward or reverse propagation path of FIG. 1. A cloud 214 is illustrated over building 202 to represent an environmental condition the vicinity of the fixed terminal 201, which may lead to temporal fades.

The present invention preferably works within a fixed wireless transmission system as depicted in FIG. 1; however those skilled in the art appreciate that many various types of system structure/architecture are possible and that the illustrated embodiment is in no way meant to be limiting on the scope of the invention.

The present invention is controlled by a set of power control algorithms. These algorithms may be implemented by a processor unit or logic unit of the routers/gateways of the transmission system. However, in the preferred embodiment, the power control algorithms and the various mechanisms of the present invention are substantially implemented in the processing systems of the base station.

The goal of the forward loop power control algorithm (FLPCA) is to allocate to the forward traffic channel just enough (i.e., not more than necessary) power to close the link. A very low gain may lead to a poor voice quality or a call drop, while a high value gain reduces the capacity, since only a limited amount of power is available. The invention thus controls the magnitude of the gain to prevent poor voice quality or call drop, but to substantially maximize the system capacity. Since the cellular system is dynamic due to the factors such as mobility and propagation environment, the FLPCA also dynamically exercises the power control operation. The invention recognizes that the goal of high capacity and good quality of service (QoS) can be attained by maintaining a certain frame error rate (FER) with a minimum amount of digital gain. If the instantaneous FER is found to be high, gain is considered insufficient, and the FLPCA increases the gain to preserve a certain FER. Conversely, if the instantaneous FER is low, the gain is considered to be in excess, and the FLPCA reduces the gain to improve the capacity.

The mobile station (MS) reports frame errors by sending a Power Measurement Report Message (PMRM) after counting $n_{TX,error}$ (e.g., 2) errors. Large $n_{TX,error}$ delays the response of the FLPCA to deteriorating channel conditions, while low $n_{TX,error}$ causes frequent messages. After the MS sends a PMRM, it resets the frame error counter and ignores the quality of the next four frames before incrementing the error counter again. At the base station, there is a certain delay before any action on the PMRM (e.g., gain increase) is taken. This delay is largely due to the processing required to decode the PMRM. There is approximately a seven-frame delay (represented by a parameter called $\Delta T_{TX,increase}$) between the transmission of a bad frame and the transmission of a frame with gain increase in response to the bad frame quality. The base station reduces the digital gain by the amount of $\Delta_{down}$ by default and increases the digital gain by the amount of $\Delta_{up}$ after receiving the PMRM. The digital gain decrease step down size ($\Delta_{down}$) and increase step up size ($\Delta_{up}$) are given by Eq. (2) and Eq. (3). One power control loop period is defined as time period during which there is one gain increase and several successive gain decreases. If the target FER (called $Pr_{TX,error}$ in Eq. (1)) is 2%, there is one gain increase (in response to two errors due to $n_{TX,error}$ of two) and 100 successive gain decreases in a power control loop period. Thus, the number of steps in a power control loop period is $$n_{TX} = \frac{n_{TXerror}}{Pr_{TXerror}} \quad (1)$$

The power (or digital gain) down step size is given by $$\Delta_{down} = \frac{G_{pilot}\left(10^{\frac{R_{TX,increase}}{20}} - 1.0\right)\Delta T_{TX,increase}}{n_{TX} - \Delta T_{TX,increase}} \quad (2)$$

where $G_{pilot}$ is the pilot channel digital gain and $R_{TX,increase}$ is known as maximum loop increase response rate.

The power (or digital gain) up step size is determined as $$\Delta_{up} = \Delta_{down}(n_{TX} - 1) \quad (3)$$

During normal power control operation, there is a gain increase for every reception of a PMRM and a small step size gain decrease in the absence of a PMRM. In a fixed wireless environment, frame errors increase the frequency of PMRMs and culminate in several gain increases within a short period. After the fade is over (or when the gain increase is sufficient to overcome the fade), the frame quality improves, and the MS begins to receive good frames. However, there is a delay of approximately $\Delta T_{TX,increase}$ frames before the base station knows the effect of the pervious gain increase. For example, assume that there are two gain increases during a time duration of 6 frames and several subsequent frames (e.g., six) are good. The first gain increases can be considered sufficient (and, the second gain increase unnecessary) if it several consecutive frames after the time duration of $\Delta T_{TX,increase}$ frames following the first gain increase are good. It is assumed that if a gain increases is sufficient, there will not be any more frame errors when the increased gain start affecting quality of frames received at the MS.

In a fixed wireless environment, temporal fades are long and infrequent. The long temporal fades cause bursts of frame errors and several gain increases in a relatively short time period, as explained earlier. Eq. (2) and Eq. (3) give the step up and down sizes. Since $\Delta_{down}$ is very small compared to $\Delta_{up}$, it takes long time for the digital gain to come down to the steady state level ($G_{ss}$) after the fade is over. Since the fades are infrequent in a fixed environment, there is a large amount of power that does not contribute much to overcome fading for a long time period. A normal power control loop operation consists of one power up step of the size $\Delta_{up}$ and several power down steps of the size $\Delta_{down}$ within on power control loop period.

In one embodiment of the invention, the frame quality feedback is exploited at the base station to nullify unnecessary gain increases. Since the (frame quality) feedback is evaluated to make the fast power decision, the algorithm of the invention is herein referred to as Feedback Evaluation Based Power Control Algorithm (FEPCA).

In the preferred embodiment, the FEPCA creates an observation window after receiving a PMRM. The observation window is terminated when several consecutive good frames occur. During the observation window, time instants (or frame indices) of the gain increases are recorded. After the observation window is terminated, the total number of gain increases and time instants of the gain increases are known at the base station. If the first good frame has occurred within $\Delta T_{TX,increase}$ frames of a gain increase, all the subsequent gain increases are considered redundant. $\Delta T_{TX,increase}$ is a predetermined value selected based on system architecture and other parameters. The FEPCA reduces the digital gain by the amount of the unnecessary gain increases. For example, if there is one extra gain increase, the gain is reduced by $\Delta_{up}$ and if there are two extra gain increases, the gain is reduced by $2\Delta_{up}$. After performing such fast power down operation, the operation of normal step down for good frames and normal step up for bad frames resumes.

There is a definite relationship between $\Delta_{down}$ and $\Delta_{up}$ (represented by Eq. (1), Eq. (2), and Eq. (3)), and, hence, to preserve FER, a proper power control loop operation must be maintained. Reducing the power quickly, as completed by the FEPCA effectively eliminates one or more power control loop periods. Hence, if the normal power step down size is used after the fast power down operation, the gain level drops below a given threshold earlier than the case where no fast power down operation is performed. The frame error rate will increase as a result of the fast power down process. To alleviate this problem, the FEPCA modifies the step down size such that the overall loop period remains the same.

Figure 2:
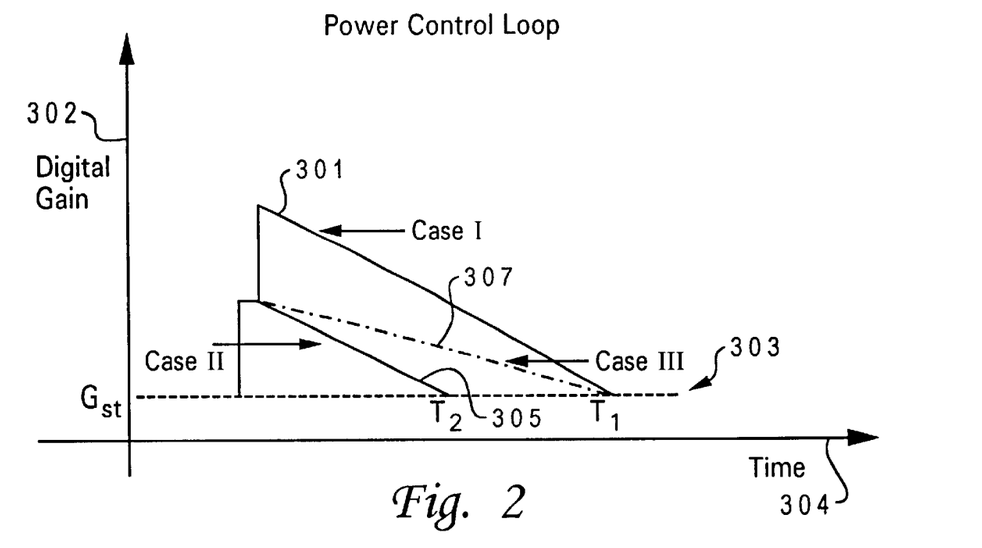
FIG. 2 is a high level graph of the power control processes on a fixed wireless system in accordance with a preferred embodiment of the present invention.

FIG. 2 illustrates a graph of the changes in power according to one embodiment of the invention. In creating the graph, it is assumed that there are two gain increases and that the second gain increase is unnecessary. The graph plots the digital gain on the Y axis 302 against time on the X axis 304. As depicted by the normal power down operation, called Case 1 301, if there is no fast power down operation, the normal power operation will cause an error to occur at the time instant $T_1$ when the digital gain level crosses the steady-state level 303 (called $G_{ss}$, in FIG. 2). However, as illustrated by Case II 305, if a fast power down mechanism is activated without changing the power step size, the digital gain will drop below $G_{st}$ 303 at the time instant $T_2$, which is much earlier than the time instant $T_1$. Since the power step down size is the same (indicated by similar slopes), the rate of the gain decrease is the same for Case I 301 and Case II 305. However, if, as illustrated by Case III 307, the power step down size is changed (i.e., reduced compared to the normal step down size) by an appropriate amount, the expected time instant error will be close to $T_1$. In this embodiment, when the fast power down mechanism is activated, i.e., Case III 307, there is relatively smaller instantaneous fade margin compared to Case I 301. Hence, some increase in FER may be expected in the case of fast power down operation. In the preferred embodiment, higher FER degradation for the fast power down is avoided by modifying the down step size as shown for Case III 307.

Figure 4A:
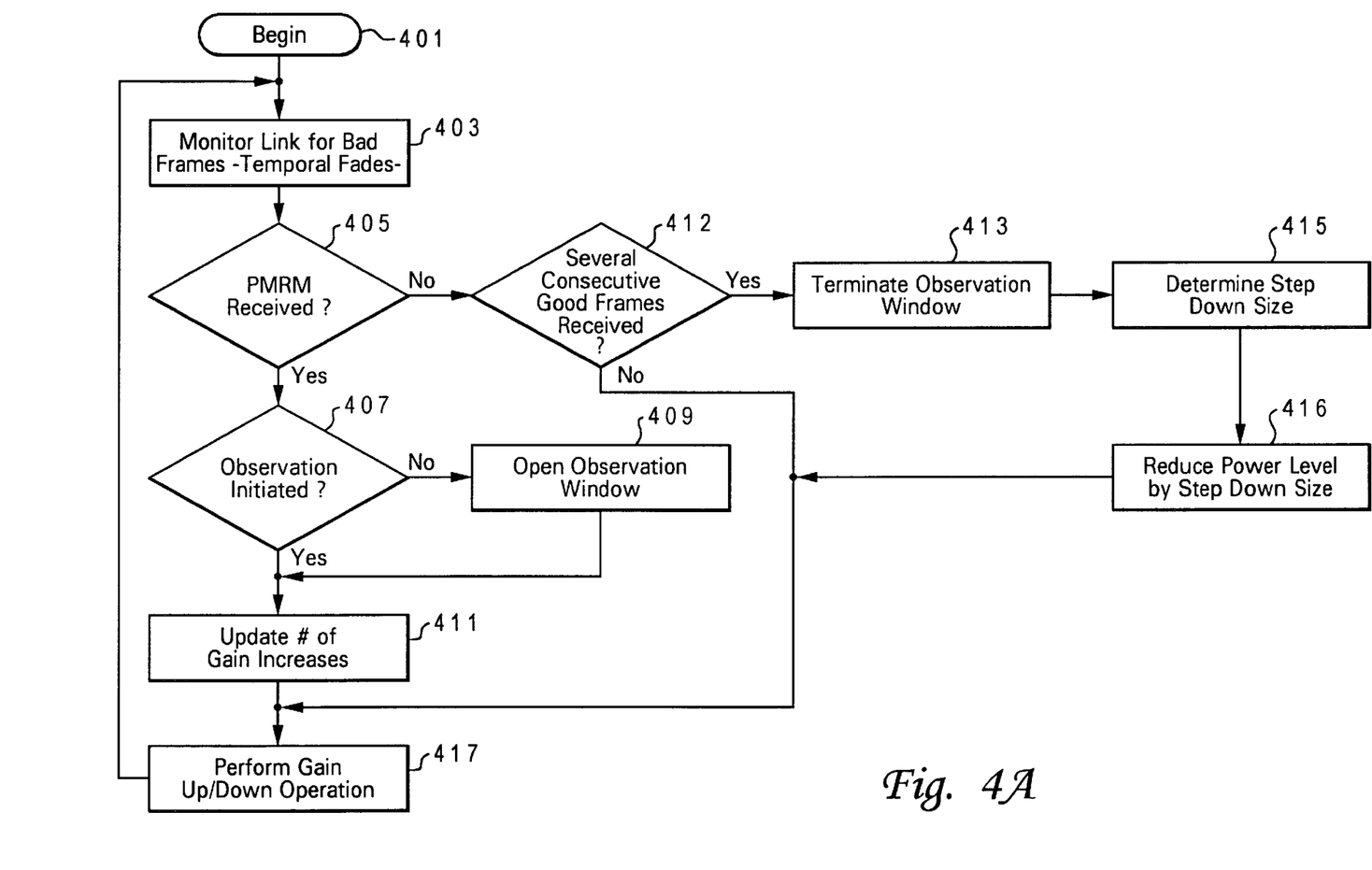
FIG. 4A is a flow chart of the process involved in the power control algorithm in accordance with a preferred embodiment of the present invention.

FIG. 4A depicts the flowchart of the processes of the FEPCA. The process begins (step 401) with the system monitoring the links for a PMRM (step 403). After a PMRM is received (step 405), a determination is made of whether or not an observation window has already been initiated (step 407). The observation window is initiated upon the receipt of the first PMRM in a series. Subsequent PMRM do not cause other observation windows to be initiated. If the observation window has already been received, the number of gain increases is updated (step 411) and the monitoring of the link continues. If however, the observation window has not been opened, indicating a first occurrence of a PMRM, the observation window is initiated (step 409) prior to the gain increase being updated (step 411). When the frame received is not accompanied by a PMRM, a check is made to determine if several consecutive good frames have been received (step 412) If several consecutive good frames have been received, the observation window is closed (step 413). The algorithm then determines the number of extra gain increases between the initial gain increase and the receipt of a good frame. The algorithm determines an appropriate step-down size (step 415). The power level is then adjusted (i.e., reduced) by the number of extra gain increases (step 416). Then the normal power control operation (of increasing or decreasing digital gain) is resumed (step 417). The step down size after the observation period is over is calculated as:

$$\Delta_{down,new} = \Delta_{down,normal} \frac{(N_{observed} - N_{extra})}{N_{observed}}$$

where $\Delta_{down,normal}$ is the normal down step size, $N_{observed}$ is the number of observed gain increases, and $N_{extra}$ is the number of extra gain increases.

In the preferred embodiment, the following set of characteristics of the FEPCA are derived to create a new generic power control loop operation based on knowledge of propagation environment:

(1) The power may be reduced significantly during the initial period after the fade is over (i.e., when several good frames have been received after a gain increase). Since the fade has occurred in the recent past, it is unlikely to occur in the near future. Thus, fast power down during the initial phase of a power control loop period is desirable;

(2) As more time elapses from the instant of the departure of the last fade, the likelihood of the arrival of a new fade increases. Thus, during the intermediate phase of the power control loop period, an aggressive step down is not used; instead, a moderately aggressive power step down is used to provide some fade margin; and (3) Near the end of the power control loop period, it is highly likely that a fade is imminent. Thus, some extra fade margin is provided near the possible fade instant by choosing an appropriate step down size. Such step down size ensures that the absolute value of the digital gain near the end of the normal power loop period is higher than the value for a normal power loop operation. This type of extra margin may delay the occurrence of a fade, potentially saving some frames from being influenced by the oncoming fade.

Figure 4B:
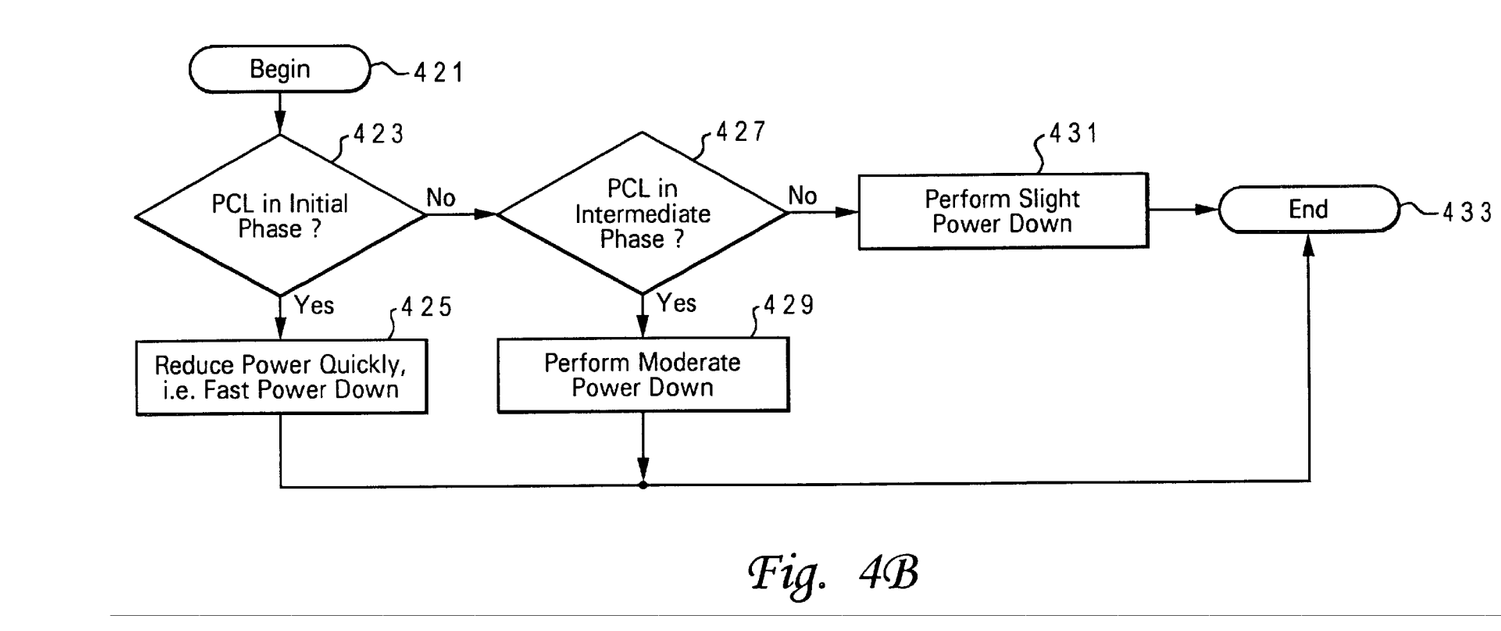
FIG. 4B is a flow chart of the process of powering-down utilizing the power control algorithm in accordance with a preferred embodiment of the present invention.

FIG. 4B illustrates a brief flow chart of the above tri-period power level management process. The process begins (step 421) with a determination of whether or not the power control loop of the current frame is in the initial phase (step 423). If it is in the initial phase, a fast power-down is implemented (step 425). If however, it is not in the initial phase, a further determination is made of whether or not the power control loop is in the intermediate phase (step 427). If it is in the intermediate phase, a moderate power-down is implemented (step 429). Otherwise, a slight power-down is implemented (step 431) as the power control loop is in its end phase. Then the process ends (step 433). These and other features are further explained below.

Figure 3:
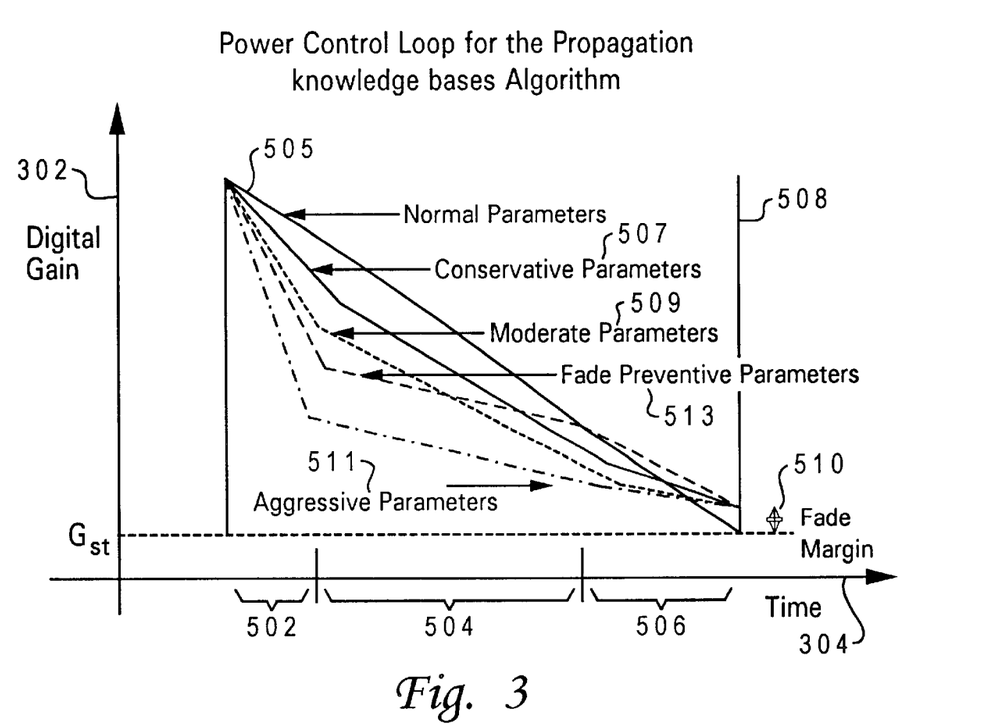
FIG. 3 is a high level graph of a power control loop of the propagation knowledge based algorithm in accordance with a preferred embodiment of the present invention.

FIG. 3 is a graph illustrating the flexible power control loop of the invention. The graph plots the digital gain on the Y axis 302 against time on the X axis 304. A single sloped decrease illustrates the normal parameters 505 without the FEPCA. In the preferred embodiment, the rate of power decrease with FEPCA is highest during the initial phase 502 of the power control loop and gradually decreases toward the end 508 of the power control loop period. As can be observed, there is an extra fade margin 510 for the power control loop of the invention. The parameters of the normal power control algorithms are referred to as normal parameters 505, while four types of parameters are shown for the FEPCA. These include, conservative parameters 507, which have the most conservative power down mechanism, aggressive parameters 511, and moderate parameters 509. The power down mechanism for moderate parameters 509 is between the mechanism for conservative and aggressive parameters 507 and 511. Conservative, moderate, and aggressive parameters 507, 509, and 511 assume that the effect of a fade will be experienced near the end of the power control loop period. However, if a fade is deep and high-gradient, instantaneous fade margins provided by the proposed algorithms may be insufficient. Thus, a fourth class of parameters called fade preventive parameters 513 is defined.

During the intermediate stage 504 of the power control loop period, the power step down mechanism is kept very conservative, thereby making the instantaneous fade margin for the fade preventive parameters 513 larger than the margin for moderate and aggressive parameters 509, and 511. However, it may be noted that the instantaneous fade margin provided by FEPCA is usually smaller than the margin provided by the normal algorithm. Thus, a slight increase in FER may be expected when some power saving is achieved for the proposed algorithm.

The algorithms presented by the invention provides significant capacity improvement, allowing a larger number of users per sector in a CDMA based network. Higher capacity is a critical component of the overall performance of a fixed wireless product, making this invention invaluable to developing fixed wireless systems.

While the invention has been particularly shown and described with reference to a preferred embodiment, it will be understood by those skilled in the art that various changes in form and detail may be made therein without departing from the spirit and scope of the invention.

What is claimed is:

1. A method for efficient power control in a wireless communications system, said method comprising the steps of:

monitoring a transmission link of said wireless communications system for an occurrence of a fade, indicated by a received message;

opening an observation window on receipt of said message, wherein said observation window is a period beginning when a fade is first indicated by receipt of said message and ending when the fade is no longer present as indicated by a receipt of consecutive good frames;

recording time instances and a number of power increases to said transmission link due to said fade;

closing said observation window when consecutive good frames are received;

calculating an initial step down size Lo reduce the power level by an amount substantially equal to a combined amount of power increases during said fade utilizing the number of power increases following a recorded time instant within said observation period, wherein said combined amount of power increases is determined based on receipt of a first good frame of said consecutive good frames within a set number of frames following a time instance of a gain increase after the beginning of said fade; and reducing power to said transmission link by said calculated initial step down size when said fade ends.

2. The method of claim 1, wherein said reducing step comprises:

determining a number of unnecessary power increases due to said fade; and decreasing said power by said number of unnecessary power increases.

3. The method of claim 2, wherein:

said determining step further comprises the step of analyzing which one of a sequence of gain increases is sufficient to overcome said fade; and said decreasing step comprises the step of reducing said power by all gain increases subsequent to said sufficient gain increase.

4. The method of claim 1, further comprising adjusting a basic power control loop of said transmission link to include (1) a first power down on said transmission link substantially equal to a combined sum of all unnecessary power increases during said fade and (2) a second power down initiated as a sequence of small steps that become smaller as the loop approaches a completion phase.

5. The method of claim 4, wherein said adjusting step includes the steps of:

selecting a predetermined power-down step size, which results in conserving power, wherein said step size is influenced by a frame error rate (FER) and selected to maintain a desired FER; and dynamically decreasing said power by said predetermined power down step size, thereby conserving power and increasing system capacity.

6. The method of claim 1, further comprising:

delineating a power-down time period of said power control loop into at least a first time period and a second time period corresponding respectively to an earlier time period and a later time period; and effecting a larger gain decrease during said power-down in said earlier time period and a smaller gain decrease in said later time period.

7. The method of claim 5 wherein:

said selecting step further includes the steps of monitoring said FER; and said dynamically decreasing step further includes the step of adjusting said power based on said FER, wherein said gain is increased when said FER is too high and decreased when said FER is too low, to substantially improve system capacity.

8. The method of claim 1, further comprising:

receiving, at a base station, a power measurement report message (PMRM) from a mobile station to report frame errors, wherein, when said PMRM is a first PMRM received after a sequence of good frames are received; said PAM operating as the message that triggers the opening of the observation window; and increasing a digital gain upon receipt of said PMRM.

9. The method of claim 1, further comprising the steps of:

selecting a reference variable, T, corresponding to a number of frames received;

determining if a first good frame of said consecutive good frames occurred within T frames of a gain increase; and reducing said digital gain by an amount equal to all subsequent gain increases after said gain increase, when said first good frame occurred within T frames of said gain increase, thus implementing a fast power-down operation.

10. A method for increasing capacity of a wireless communications system, said method comprising:

monitoring a transmission link of said wireless communications system for a measurable condition that indicates an occurrence of a fade, said measurable condition from among (1) increase in a frame error rate (FER) and (2) receipt of a power measurement report message initiating a measurement period when an initial one of said measurable condition is detected following receipt of a sequence of good frames;

terminating said measurement period when a first sequence of good frames is received following the initiating step;

recording a number of power increases to said transmission link during said measurement period;

determining which ones of said number of power increases were not required to maintain a FER of said transmission link before said fade;

calculating an initial step down size to reduce the power level by an amount substantially equal to a combined amount of the number of power increases during said fade wherein said combined amount of power increases is determined based on receipt of a first good frame of said sequence of good frames within a set number of frames following a time instance of a gain increase after the beginning of said fade; and reducing said power to a level required to maintain said pre-fade FER by implementing an immediate power down step substantially equal to the initial step down size and then subsequently reducing said power by a step size that is a fractional part of one of said power increases during said fade, wherein said reducing of said power by said immediate power down step effectuates an increase in capacity of said fixed wireless system.

11. A system for implementing a feedback based power control algorithm in a wireless communications system, said system comprising:

means for monitoring a transmission link of said wireless communications system for an occurrence of a fade, indicated by a received message;

means for opening an observation window on receipt of said message, wherein said observation window is a period beginning when a fade is first indicated by receipt of said message and ending when the fade is no longer present as indicated by a receipt of consecutive good frames;

means for recording time instances and a number of power increases to said transmission link due to said fade;

means for closing said observation window when consecutive good frames are received;

means for calculating an initial step down size to reduce the power level by an amount substantially equal to a combined amount of power increases during said fade utilizing the number of power increases following a recorded time instant within said observation period, wherein said combined amount of power increases is determined based on receipt of a fist good frame of said consecutive good frames within a set number of frames following a time instance of a gain increase after the beginning of said fade; and means for reducing power to said transmission link by said calculated initial step down size when said fade ends.

12. The system of claim 11, wherein said reducing means further comprises:

means for determining a number of unnecessary power increases due to said fade; and means for decreasing said power by said number of unnecessary power increases.

13. The system of claim 12 wherein:

said determining means further comprises means for analyzing which one of a sequence of gain increases is sufficient to overcome said fade; and said decreasing step comprises means for reducing said power increase by all gain increases subsequent to said sufficient gain increase.

14. The system of claim 11, further comprising means for adjusting a basic power control loop of said transmission link to include (1) a first power down on said transmission link substantially equal to a combined sum of all unnecessary power increases during said fade and (2) a second power down initiated as a sequence of small steps that become smaller as the loop it approaches a completion phase.

15. The system of claim 14, wherein said adjusting means includes:

means for selecting a pre-determined power-down step size, which results in conserving power, wherein said step size is influenced by a frame error rate (FER) and selected to maintain a desired FER; and means for dynamically decreasing said power by said predetermined power down step size, thereby conserving power and increasing system capacity.

16. The system of claim 11, further comprising:

means for delineating a power-down time period of said power control loop into at least a first time period and a second time period corresponding respectively to an earlier time period and a later time period; and means for effecting a larger gain decrease during said power-down in said earlier time period and a smaller gain decrease in said later time period.

17. The system of claim 15, wherein:

said selecting means further includes means for monitoring said FER; and said dynamically decreasing means further includes means for adjusting said power based on said FER, wherein said gain is increased when said FER is too high and decreased when said FER is too low, to substantially improve system capacity.

18. The system of claim 11, further comprising:

means for receiving, at a base station, a power measurement report message (PMRM) from a mobile station to report frame errors, wherein, when said PMRM is a first PMRM received after a sequence of good frames are received, said PMRM operating as the message that triggers the opening of the observation window; and means for increasing a digital gain upon receipt of said PMRM.

19. The system of claim 11, further comprising:

means for selecting a reference variable, T, corresponding to a number of frames received;

means for determining if a first good frame of said consecutive good frames occurred within T frames of a gain increase; and means for reducing said digital gain by an amount equal to all subsequent gain increases after said gain increase, when said first good frame occurred within T frames of said gain increase, thus implementing a fast power-down operation.

\* \* \* \* \*

UNITED STATES PATENT AND TRADEMARK OFFICE
CERTIFICATE OF CORRECTION

PATENT NO. : 6,587,442 B1
DATED : July 1, 2003
INVENTOR(S) : Nishith D. Tripathi It is certified that error appears in the above-identified patent and that said Letters Patent is hereby corrected as shown below:

Column 9,
Line 18, delete "Lo" and insert -- to --.

Column 10,
Line 14, delete "PAM" and insert -- PMRM --.
Line 34, delete "message" and insert -- message (PMRM) --.

Column 11,
Line 47, delete "it"

Signed and Sealed this

Twenty-seventh Day of January, 2004

JON W. DUDAS
*Acting Director of the United States Patent and Trademark Office*